United States Patent
Banno

(10) Patent No.: US 10,735,517 B2
(45) Date of Patent: Aug. 4, 2020

(54) COMMUNICATION SYSTEM AND COMMUNICATION METHOD

(71) Applicant: TOYOTA JIDOSHA KABUSHIKI KAISHA, Toyota-shi, Aichi-ken (JP)

(72) Inventor: Masahide Banno, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 254 days.

(21) Appl. No.: 15/729,858

(22) Filed: Oct. 11, 2017

(65) Prior Publication Data
US 2018/0124180 A1 May 3, 2018

(30) Foreign Application Priority Data
Oct. 31, 2016 (JP) .................. 2016-213501

(51) Int. Cl.
*H04L 29/06* (2006.01)
*H04L 29/08* (2006.01)
(Continued)

(52) U.S. Cl.
CPC .............. *H04L 67/12* (2013.01); *H04L 9/002* (2013.01); *H04L 9/0891* (2013.01); *H04L 9/3226* (2013.01); *H04L 63/0428* (2013.01); *H04L 63/08* (2013.01); *H04L 63/0846* (2013.01); *H04L 63/12* (2013.01); *H04L 63/123* (2013.01);
(Continued)

(58) Field of Classification Search
CPC ......... H04L 67/12; H04L 9/002; H04L 63/08; H04L 2463/041; H04W 12/06
See application file for complete search history.

(56) References Cited

U.S. PATENT DOCUMENTS 3,767,901 A * 10/1973 Black .................. G06T 13/00
  318/568.11
4,162,536 A * 7/1979 Morley ............... G05B 19/054
  714/18
(Continued)

FOREIGN PATENT DOCUMENTS

JP  2011-066703 A  3/2011

*Primary Examiner* — John B King
*Assistant Examiner* — Darshan I Dhruv
(74) *Attorney, Agent, or Firm* — Hunton Andrews Kurth LLP

(57) ABSTRACT

A communication system includes a management device, a reception device, and a transmission device. The reception device and the transmission device are configured to hold first information included in a received first communication message each time the reception device and the transmission device receive the first communication message. The transmission device is configured to manage second information of a management code, and generate a first authenticator from communication data and a management code formed by combining the held first information with the managed second information. The reception device is configured to receive a second communication message transmitted by the transmission device, and authenticate the received second communication message based on a comparison between the first authenticator included in the received second communication message and a regenerated authenticator regenerated based on the received second communication message.

11 Claims, 5 Drawing Sheets

(51) Int. Cl.
*H04L 9/08* (2006.01)
*H04L 9/32* (2006.01)
*H04L 9/00* (2006.01)
*H04W 12/06* (2009.01)

(52) U.S. Cl.
CPC ...... *H04L 63/0435* (2013.01); *H04L 63/1475* (2013.01); *H04L 2209/84* (2013.01); *H04L 2463/041* (2013.01); *H04W 12/06* (2013.01)

(56) References Cited

U.S. PATENT DOCUMENTS

| | | | |
|---|---|---|---|
| 4,591,851 A * | 5/1986 | Noble | G06K 13/0825 340/3.21 |
| 5,475,863 A * | 12/1995 | Simpson | H04W 88/187 455/458 |
| 5,694,428 A * | 12/1997 | Campana, Jr. | H04B 7/10 370/509 |
| 6,829,357 B1 * | 12/2004 | Alrabady | H04L 9/0656 380/260 |
| 6,988,238 B1 * | 1/2006 | Kovacevic | H04L 1/0083 348/E5.108 |
| 9,998,494 B2 * | 6/2018 | Nairn | H04L 63/1466 |
| 2009/0013356 A1 * | 1/2009 | Doerr | H03M 13/29 725/62 |
| 2009/0276106 A1 * | 11/2009 | Doan | G06F 11/3696 701/3 |
| 2010/0279610 A1 * | 11/2010 | Bjorhn | G06Q 20/20 455/41.2 |
| 2011/0066856 A1 * | 3/2011 | Yao | H04L 9/3271 713/170 |
| 2014/0310530 A1 * | 10/2014 | Oguma | H04L 9/3242 713/181 |
| 2015/0082380 A1 * | 3/2015 | Nairn | H04L 63/1466 726/2 |
| 2016/0297401 A1 * | 10/2016 | Haga | H04L 9/3242 |
| 2018/0091329 A1 * | 3/2018 | Matsushita | H04L 12/40169 |
| 2018/0124180 A1 * | 5/2018 | Banno | H04L 9/0891 |
| 2018/0167216 A1 * | 6/2018 | Walrant | H04L 63/0428 |
| 2018/0219872 A1 * | 8/2018 | Sugashima | H04L 63/08 |
| 2019/0074975 A1 * | 3/2019 | Koskimies | H04W 12/1008 |

* cited by examiner

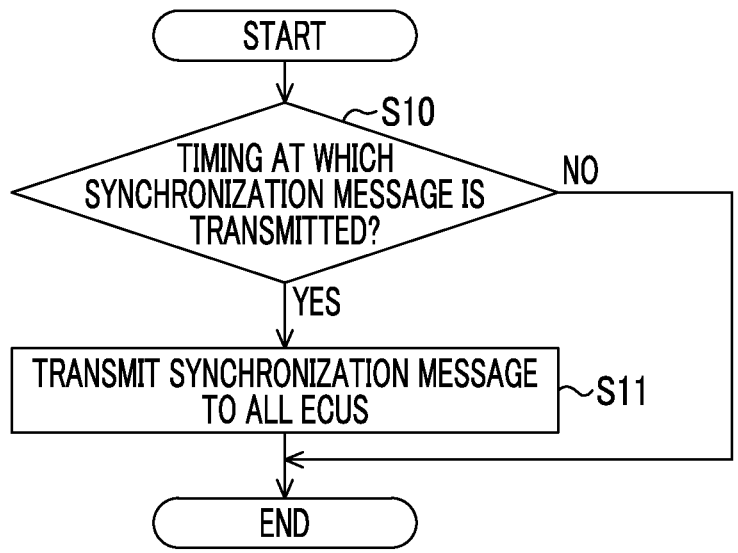
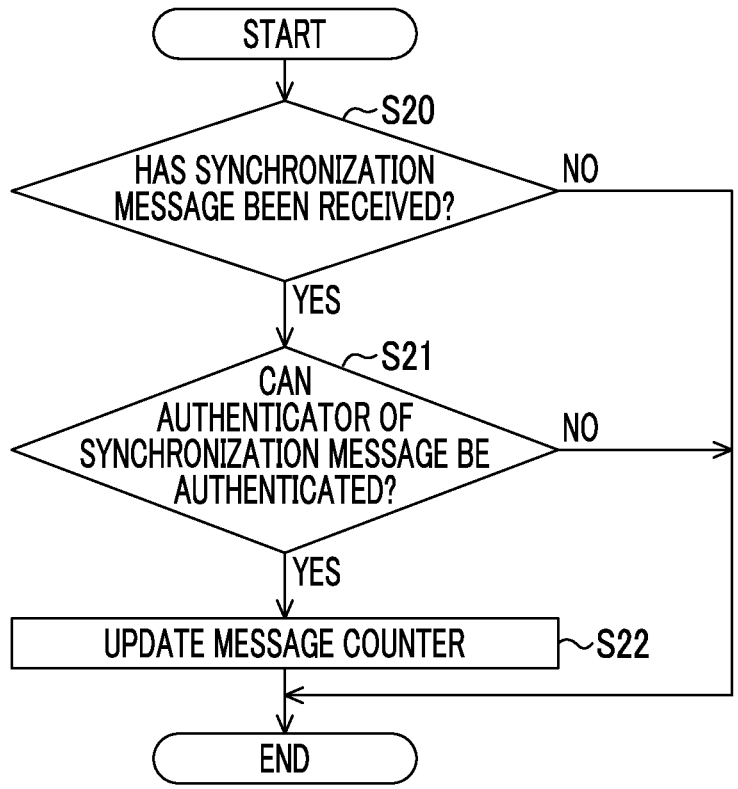

COMMUNICATION SYSTEM AND COMMUNICATION METHOD

INCORPORATION BY REFERENCE

The disclosure of Japanese Patent Application No. 2016-213501 filed on Oct. 31, 2016 including the specification, drawings and abstract is incorporated herein by reference in its entirety.

BACKGROUND

1. Technical Field

The present disclosure relates to a communication system to which a plurality of electronic control units mounted on a vehicle is connected over a network, and a communication method that is used in the communication system.

2. Description of Related Art

As is well known, a plurality of electronic control units (ECUs) mounted on a vehicle is often connected to the same network to constitute a communication system for a vehicle in which information (vehicle information) that the electronic control units (ECUs) have can be transmitted and received to and from each other. An example of such a communication system is described in Japanese Unexamined Patent Application Publication No. 2011-66703 (JP 2011-66703 A).

The communication system described in JP 2011-66703 A includes a transmission terminal that transmits data, and a reception terminal that receives data from the transmission terminal. The transmission terminal includes a data acquirer, a receiver, a key acquirer, and a time-varying parameter manager that receives challenge information from the receiver and manages a time-varying parameter. Further, the transmission terminal includes a data converter that converts received communication data using key information, challenge information, and a time-varying parameter that have been received to generate conversion data, and a transmitter that receives the conversion data from the data converter and transmits the conversion data to the reception terminal. On the other hand, the reception terminal includes a challenge generator that generates challenge information, a transmitter that transmits the challenge information to the transmission terminal, and a receiver that receives the conversion data from the transmission terminal, and a key acquirer that acquires the same key information as key information in the transmission terminal. Further, the reception terminal includes a time-varying parameter determiner that determines novelty of received conversion data, and a data authentication unit that authenticates whether the received conversion data is correctly converted using the key information, the challenge information, and the time-varying parameter that have been received, and transmits a result of the authentication to the time-varying parameter determiner. The time-varying parameter determiner determines novelty of the conversion data based on the authentication result received from the data authentication unit.

SUMMARY

According to the system described in JP 2011-66703 A, a time-varying parameter included in a communication message is intended to suppress spoofing on an authorized sender by an attacker incapable of appropriately changing the time-varying parameter, and improve reliability of a communication message.

However, it is desirable for a value of the time-varying parameter to be used up only once in order to further ensure reliability of the communication message, but this inevitably increases a data length of the time-varying parameter. When the time-varying parameter having a relatively longer data length is included in a communication message to be transmitted, traffic increase due to such a communication message including the time-varying parameter cannot be ignored.

The present disclosure provides a communication system capable of ensuring reliability of a communication message while suppressing an increase in traffic, and a communication method used for the communication system.

A first aspect of the present disclosure relates to a communication system including a management device configured to store first information in a management code formed by combining the first information and second information, the management device being configured to manage the stored first information to update the stored first information once, each time the second information is updated predetermined times; a reception device communicatably connected to the management device over a communication network; and a transmission device communicatably connected to the management device over the communication network. The management device is configured to transmit a first communication message including the first information to the communication network. The reception device and transmission device are configured to receive the first communication message and to hold the first information included in the received first communication message each time the reception device and the transmission device receive the first communication message. The transmission device is configured to manage the second information in the management code, and configured to generate an first authenticator from the communication data and the management code formed by combining the held first information with the managed second information, generate and transmit a second communication message including the communication data, the managed second information, and the generated first authenticator and not including the held first information, and update a value of the managed second information after the generation of the second communication message. The reception device is configured to receive the second communication message transmitted by the transmission device, and authenticate the received second communication message based on a comparison between the first authenticator included in the received second communication message and a regenerated authenticator regenerated based on the received second communication message. The reception device is configured to reconstruct the management code by combining the held first information with the second information acquired from the second communication message, and acquire the regenerated authenticator from the communication data acquired from the second communication message transmitted by the transmission device and the reconstructed management code.

In the communication system according to the first aspect, the management device may be configured to set the first communication message including the first information as a communication message including an second authenticator generated from the first information, and the first information. Each of the reception device and the transmission device may be configured to receive the first communication message transmitted by the management device, and perform authentication of the received first communication message through a comparison between the second authenticator included in the received first communication message and a regenerated authenticator regenerated from the first information included in the received first communication message.

According to the configuration, for the first information in the management code transmitted in the communication message from the management device, reliability of communication content is maintained, as compared with a case where only the first information is transmitted.

Further, according to the configuration, the authenticator transmitted in the communication message from the management device is an authenticator generated from the first information in the management code. Therefore, in the reception device or the transmission device that has received the communication message, the authenticator transmitted in the communication message and the authenticator generated from the first information in the management code transmitted in the communication message can be acquired, and authentication of the communication message can be performed through a comparison with the authenticator. Therefore, the reception device and the transmission device receive the communication message from the management device, and thus, it is possible to acquire the first information in the management code of which the reliability has been ensured and perform the authentication of the communication message based on the first information.

In the communication system according to the first aspect, the management code may be bit data, the first information may be upper bits, the second information may be lower bits, the management device may be configured to update the upper bits with a new value not duplicating a previous value at a timing before all patterns of the lower bits are used up, and transmit the first communication message, the transmission device may be configured to initialize the lower bits of the management code each time the first communication message transmitted from the management device is received, and perform updating of the lower bits of the management code that is performed each time the first communication message is generated, with a non-duplicating value before the first communication message transmitted from the management device is subsequently received.

According to the configuration, since the first information and the second information correspond to the upper bits and the lower bits of the management code, respectively, it can be easy to divide the management code into two and, conversely, to combine the upper bits with the lower bits.

Further, according to the configuration, when an encrypted communication message is a previously acquired authorized communication message, the communication message can be subsequently fraudulently transmitted. According to the configuration, since the value of the management code is updated not to duplicate, it is possible to determine that the communication message is not valid even when a communication message transmitted once has been retransmitted.

In the communication system according to the first aspect, different identifiers may be added to the first communication message and the second communication message according to communication content, and the management device may be configured to manage the management code separately from the identifier. According to the configuration, since the management code is managed separately from the identifier, a size needed for the management code is suppressed. Further, when the identifier is separate, a time margin is obtained even in the updating of the second information in the management code, and therefore, a degree of freedom of the synchronization of the management code increases.

In the communication system according to the first aspect, the transmission device and the reception device may have a common encryption key and be configured to generate the first authenticator using the encryption key. According to the configuration, the reliability of the authenticator transmitted from the transmission device, that is, the reliability of the communication message is ensured by the common encryption key. Further, it is desirable that the encryption key cannot be externally acquired using a tamper resistant memory or the like.

In the communication system according to the first aspect, the management device may have an encryption key that is common to the transmission device and the reception device, and be configured to generate the second authenticator using the encryption key (EK). According to the configuration, the reliability of the authenticator transmitted from the management device, that is, the reliability of the communication message is ensured by the common encryption key.

In the communication system according to the first aspect, the management device may be configured to transmit the first communication message when the first information is updated.

In the communication system according to the first aspect, the second information may be a counter that increments sequentially from an initial value 0 to a maximum value, and the management device may be configured to update the first information according to the second information being the maximum value.

In the communication system according to the first aspect, the second information may be a counter that increments sequentially from an initial value 0 to a maximum value, and the management device may be configured to update the first information when the second information is equal to or greater than an update value that is a threshold set below the maximum value.

A second aspect of the present disclosure relates to a communication method that is used in a communication system including a management device configured to store first information in a management code formed by combining the first information and second information in the management device, the management device being configured to manage the stored first information to update the stored first information once, each time the second information is updated predetermined times, and a reception device and a transmission device communicatably connected to the management device over a communication network. The communication method includes: transmitting, by the management device, a first communication message including the first information; receiving the first communication message, by the reception device and the transmission device, and holding, by the reception device and the transmission device, the first information included in the received first communication message each time the first communication message transmitted by the management device is received; managing, by the transmission device, the second information in the management code, generating a first authenticator from the communication data and the management code formed by combining the held first information with the managed second information, generating and transmitting a second communication message including the communication data, the managed second information, and the generated authenticator and not including the held first information, and updating a value of the managed second information after the generation of the second communication message; receiving, by the reception device, the second communication message transmitted by the transmission device, and authenticating the received second communication message based on a comparison between the first authenticator included in the received second communication message and a regenerated authenticator regenerated based on the received second communication message; and reconstructing, by the reception device, the management code by combining the held first information with the second information acquired from the first communication message transmitted by the transmission device, and acquiring the regenerated authenticator from the communication data acquired from the second communication message transmitted by the transmission device and the reconstructed management code.

It is desirable for the management code to be set to a one-time value in order to further improve the reliability of communication. However, when the management code is set to the one-time value over a use period of the communication system, the amount of information needed for the management code increases. When the management code is included in the communication message, there is a problem in that the amount of occupancy of the management code in the communication message increases, and a capacity that can be assigned to message data that is communication content to be transmitted decreases.

According to the aspect of the present disclosure, only the second information in the management code is included in the communication message, and therefore, it is possible to ensure a wide area for communication data. Further, since the first information in the management code is managed by the management device, the first information is synchronized between the transmission device and the reception device. That is, the reception device can reconstruct the management code used for generation of the authenticator in the transmission device by combining the first information transmitted from the management device with the second information included in the communication message transmitted from the transmission device. Therefore, even when a size of the management code is set to a size needed to ensure reliability, a capacity needed to store the communication message is reduced, and therefore, it is possible to reduce a capacity for communication data. Thus, it is possible to ensure reliability of the communication message while suppressing an increase in traffic.

Further, according to the aspect of the present disclosure, when the first information in the management code transmitted from the management device is received, the first information in the management code stored in the reception device and the transmission device is updated, that is, synchronized with the received first information in the management code. Therefore, even when the management code is divided into two, the first information and the second information, it is possible to authenticate the communication message using the management code.

Further, according to the aspect of the present disclosure, since the first information in the management code stored in the reception device and the transmission device can be synchronized, the stored management code is synchronized and reset to a normal value even when the first information of the stored management code is initialized asynchronously by reset or the like, and therefore, the reception device and the transmission device can normally perform the authentication.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart illustrating a procedure on the gateway side when a message counter is synchronized in the embodiment; and FIG. 7 is a flowchart illustrating a procedure on the ECU side when the message counters are synchronized in the embodiment.

DETAILED DESCRIPTION OF EMBODIMENTS

An embodiment in which a communication system is embodied will be described with reference to FIG. 1. The communication system of the embodiment is a communication system applied to an in-vehicle network mounted on a vehicle (not illustrated).

Figure 1:
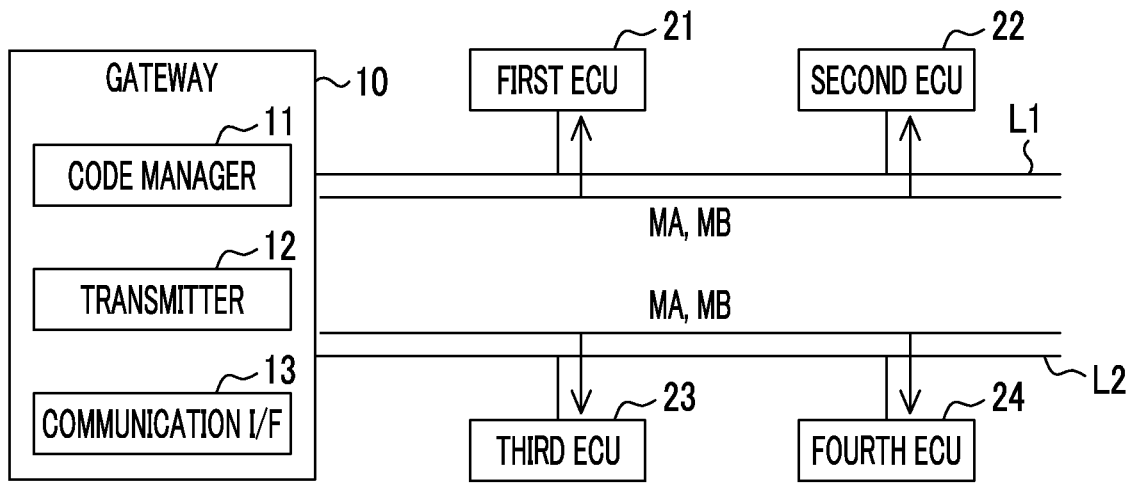
FIG. 1 is a block diagram illustrating a schematic configuration of an embodiment in which a communication system is embodied.

As illustrated in FIG. 1, the communication system includes first to fourth electronic control units (ECUs) 21 to 24 each as at least one of a transmission device and a reception device, a communication bus L1 to which the first and second ECUs 21, 22 are communicatably connected, and a communication bus L2 to which the third and fourth ECUs 23, 24 are communicatably connected. In the embodiment, the communication bus L1 and the communication bus L2 constitute a communication network. Further, the communication system includes a gateway 10 serving as a management device that is communicatably connected to the communication bus L1 and the communication bus L2. The gateway 10 can transfer (relay) a communication message MB between the communication bus L1 and the communication bus L2. Therefore, the first and second ECUs 21, 22 connected to the communication bus L1 and the third and fourth ECUs 23, 24 connected to the communication bus L2 can perform transmission and reception of the communication message MB to and from each other via the gateway 10. The communication message MB serves as a second communication message.

In the communication system, for example, a controller area network (CAN) protocol is adopted as a communication protocol. Further, in the communication system, wireless communication may be included in a part of a communication path or a path via another network via a gateway or the like may be included.

A frame that is a structure of the communication message is defined in the CAN protocol, and a storage area for a "message ID" serving as an identifier indicating a type of communication message, a "data field" that is a storage area for "message data" that is data designated by a user, and the like are provided in the frame. In the "Message ID", a specific value is defined for each type of communication message, and each ECU adds a "message ID" corresponding to the type of the communication message to a communication message to be transmitted and transmits a resultant communication message, and determines a type of a received communication message based on a "message ID". In the communication system, one "message ID" can be added to a communication message and a resultant communication message can be transmitted only to one defined ECU. Further, the "data field" that is an area in which the "message data" is stored is set to any one of lengths of 0 to 64 bits (8 bits×0 to 8 bytes).

The gateway 10 includes a microcomputer having a computing device (central processing unit (CPU)) or a storage device. In the gateway 10, a computing device that executes a computing process of a program, a read only memory (ROM) in which the program or data is stored, and a volatile memory (random access memory (RAM)) in which a computing result of the computing device is temporarily stored are provided. Therefore, the gateway 10 loads the program held in the storage device to the computing device and executes the program to provide a predetermined function. For example, the gateway 10 performs a process of transferring the communication message MB between the communication buses L1, L2 and a process of managing a message counter MC (see FIG. 2) serving as a management code. Further, the gateway 10 includes a backup memory that stores and holds set values or computed values by receiving power from a battery all the time.

The gateway 10 includes a code manager 11 that manages the message counter MC (see FIG. 2), a transmitter 12 that transmits a part of the message counter MC, and a communication I/F 13 for exchanging the communication message MB between the communication buses L1, L2 to which the gateway 10 is connected. A function of each of the code manager 11 and the transmitter 12 is realized by a computing process of a program in the gateway 10.

The communication I/F 13 transmits and receives the communication message MB based on the CAN protocol between the communication buses L1, L2. Further, the communication I/F 13 exchanges the communication message MB with the transmitter 12 or the like. Therefore, the gateway 10 can transmit a synchronization message MA, which is output by the gateway 10, to the communication buses L1, L2, and can acquire a communication message MB, which is transmitted by another ECU, via the communication buses L1, L2. In the embodiment, the synchronization message MA has a message ID added to indicate that the synchronization message MA is a synchronization message among normal communication messages based on the CAN protocol. Therefore, the synchronization message MA is broadcasted to the respective ECUs 21 to 24 connected to the respective communication buses L1, L2, similar to the normal communication messages.

The code manager 11 will be described with reference to FIG. 2. The code manager 11 manages the message counter MC stored in the backup memory of the gateway 10. The code manager 11 stores and manages "upper bits MCH" of the message counter MC. Further, the code manager 11 acquires the latest value of "lower bits MCL" of the message counter MC from the communication message MB, and stores the value to monitor the value. Hereinafter, a total length of the message counter MC is simply referred to as a message counter MC.

The message counter MC is a counter that is managed for each "message ID" and is a counter of which the value is updated according to new generation of a communication message having a corresponding "message ID". That is, the message counter MC corresponding to each "message ID" is updated. In the embodiment, the message counter MC is a counter that is incremented by 1. Hereinafter, one "message ID" and a message counter MC corresponding to the one "Message ID" will be described by way of example. For convenience of description, description of an example of other "Message IDs" and message counters MC corresponding to the other "message IDs" will be omitted.

In the embodiment, the message counter MC is divided into two, "upper bits MCH" serving as first information and "lower bits MCL" serving as second information. The "upper bits MCH" are stored, managed, and transmitted by the gateway 10, and the "lower bits MCL" are stored, managed, and transmitted by the ECUs 21 to 24. Further, for the message counter MC, repeatedly, the gateway 10 increases the value of the "upper bits MCH" by "1" according to a change in the "lower bits MCL" from "0" to a maximum value, and the ECU sets the "lower bits MCL" to an initial value "0" according to an increase in the "upper bits MCH". Thus, the message counter MC does not have the same value again. The gateway 10 stores the "upper bits MCH" of the message counter MC in a storage area ensured as an area for storing the message counter MC, and manages the "upper bits MCH". In this case, the gateway 10 may insert the "lower bits MCL" of the message counter MC into a corresponding position of the ensured storage area to manage the "lower bits MCL", or may distributively store the message counter MC in a storage area ensured separately from the ensured storage area for storing the message counter MC to manage the "lower bits MCL". That is, the gateway 10 may insert the "lower bits MCL" received in the communication message MB into a bit corresponding to the "lower bits MCL" of the message counter MC, may set a predetermined value, or may manage the message counter MC not to include a bit corresponding to the "lower bits MCL".

The message counter MC is set to the amount of information, that is, a bit length (number of bits) that can ensure reliability of the communication message MB. For example, in a case where the reliability of the communication message MB is ensured by causing the message counter MC not to be used as the same value again while monotonically increasing the message counter MC, a calculated length (number of bits) of the message counter MC is needed to be 8 bytes from lifetime of vehicle and a transmission frequency of the communication message MB. The length of the 8 bytes is the same as a maximum length of 64 bits (=8 bytes) of the "data field". Therefore, when the message counter MC is stored in the communication message MB and transmitted, "message data" that is data designated by the user cannot be stored in the communication message MB. Therefore, as described above, the message counter MC is divided into two, the "upper bits MCH" and the "lower bits MCL", and managed.

More specifically, the code manager 11 manages the "upper bits MCH" of the message counter MC. For example, in the embodiment, in a case where the message counter MC is 8 bytes in length, the "upper bits MCH" are 7 bytes (=56 bits) in length and the "lower bits MCL" are 1 byte (=8 bits) in length. In this case, a maximum value of the "lower bits MCL" is "255".

The code manager 11 updates and manages the "upper bits MCH" of the message counter MC so that the message counter MC does not have the same value again. Specifically, the code manager 11 updates the "upper bits MCH" of the message counter MC by monotonically increasing the "upper bits MCH" at an update timing. The update timing is a timing at which the "lower bits MCL" of the message counter MC has a maximum value, that is, a timing at which all patterns of the "lower bits MCL" are used up. For example, the code manager 11 monitors the "lower bits MCL" of the message counter MC by receiving the communication message MB that is transmitted by the first ECU 21, and sets a time when the "lower bits MCL" are equal to or greater than the maximum value to the update timing.

The code manager 11 transfers the "upper bits MCH" of the message counter MC to the transmitter 12 according to the updating of the "upper bits MCH" of the message counter MC.

The transmitter 12 generates an "authenticator AC1" from the "upper bits MCH" of the message counter MC, and generates a synchronization message MA including the generated "authenticator AC1" and the "upper bits MCH" of the message counter MC. The "authenticator AC1" serves as a second authenticator. The synchronization message MA is a communication message in which the "upper bits MCH" of the message counter MC and the "authenticator AC1" obtained by encrypting the "upper bits MCH" of the message counter MC are stored in the "data field". The transmitter 12 transmits the synchronization message MA as the communication message (first communication message) with a message ID of which the priority is high in the CAN protocol to the first to fourth ECUs 21 to 24 via the communication I/F 13. The high priority message ID is assumed to be preset for the synchronization message MA. The synchronization message MA notifies the first to fourth ECUs 21 to 24 of the "upper bits MCH" of the message counter MC managed by the gateway 10, and synchronizes the "upper bits MCH" of the message counter MC that are managed by the respective ECUs 21 to 24.

Figure 2:
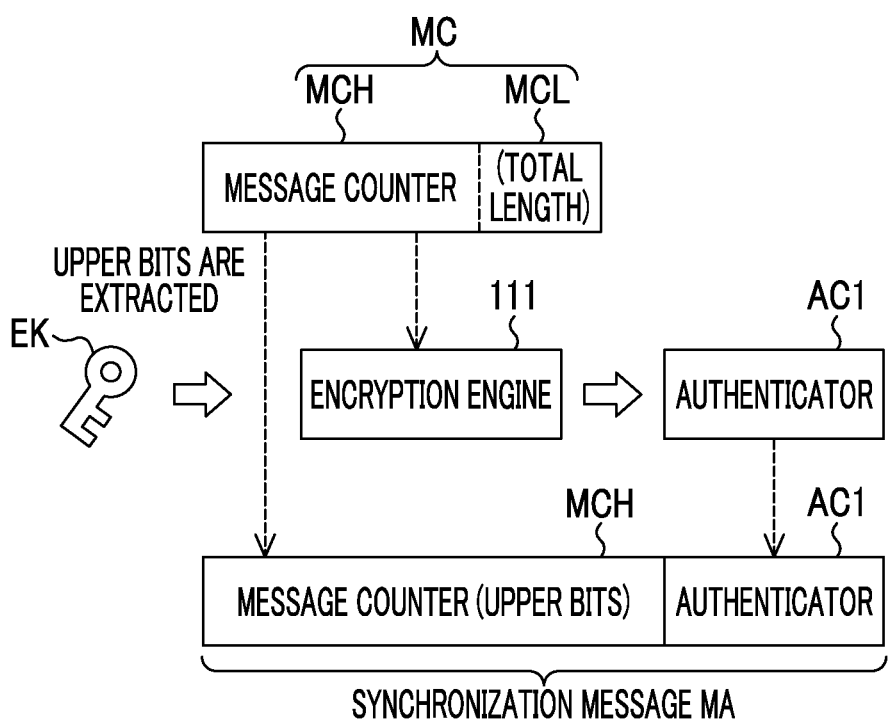
FIG. 2 is a schematic diagram illustrating an overview of a process that is executed by a gateway in the embodiment.

As illustrated in FIG. 2, the transmitter 12 includes an encryption engine 111. The encryption engine 111 has a set encryption key EK, receives the "upper bits MCH" of the message counter MC from the code manager 11, and encrypts the received "upper bits MCH" of the message counter MC with an encryption key EK to generate the "authenticator AC1". The transmitter 12 generates a synchronization message MA from the "upper bits MCH" of the message counter MC and the "authenticator AC1". It is desirable that the encryption key EK cannot be externally acquired using a tamper resistant memory or the like.

Further, the transmitter 12 transmits the synchronization message MA to all the ECUs according to the updating of the "upper bits MCH" of the message counter MC. That is, the gateway 10 transmits the "upper bits MCH" of the message counter MC.

The first to fourth ECUs 21 to 24 will be described with reference to FIGS. 3 and 4. Since the first to fourth ECUs 21 to 24 all have the same configuration, the first ECU 21 will be described in detail herein and description of the configuration of the other ECUs will be omitted.

The first ECU 21 includes a microcomputer having a computing device (CPU) or a storage device. In the first ECU 21, a computing device that executes a computing process of a program, a read only memory (ROM) in which the program or data is stored, and a volatile memory (RAM) in which a computing result of the computing device is temporarily stored are provided. Therefore, the first ECU 21 loads the program held in the storage device to the computing device and executes the program to provide a predetermined function. For example, the first ECU 21 performs a process of transmitting and receiving the communication message MB to and from the communication bus L1, a process of receiving the synchronization message MA, or a process of managing the message counter MC serving as a management code. Further, the first ECU 21 includes a backup memory that stores and holds set values or computed values by receiving power from a battery all the times.

Figure 3:
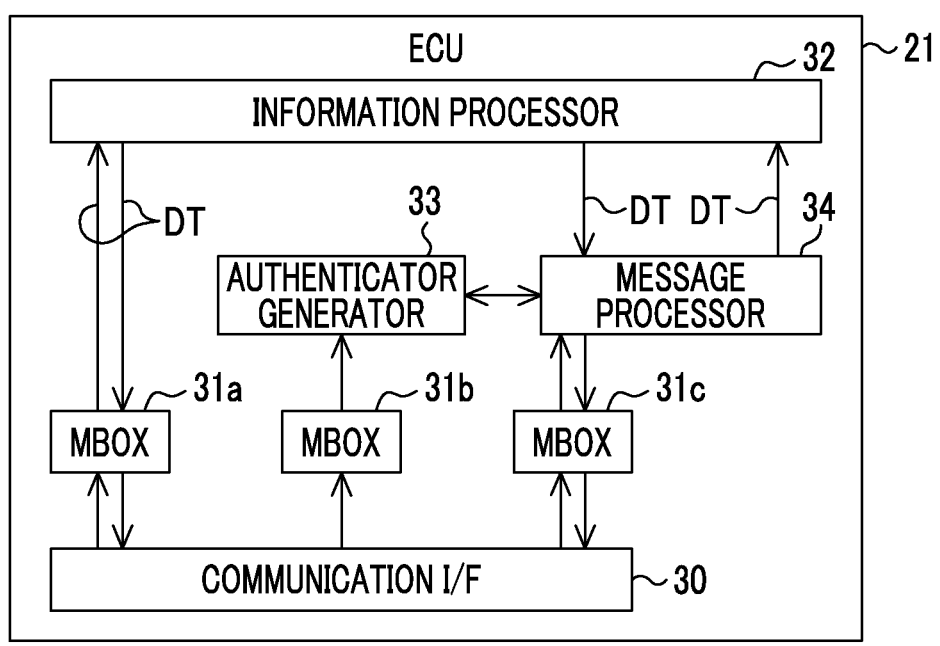
FIG. 3 is a schematic diagram illustrating a schematic configuration of an electronic control unit (ECU) according to the embodiment.
Figure 4:
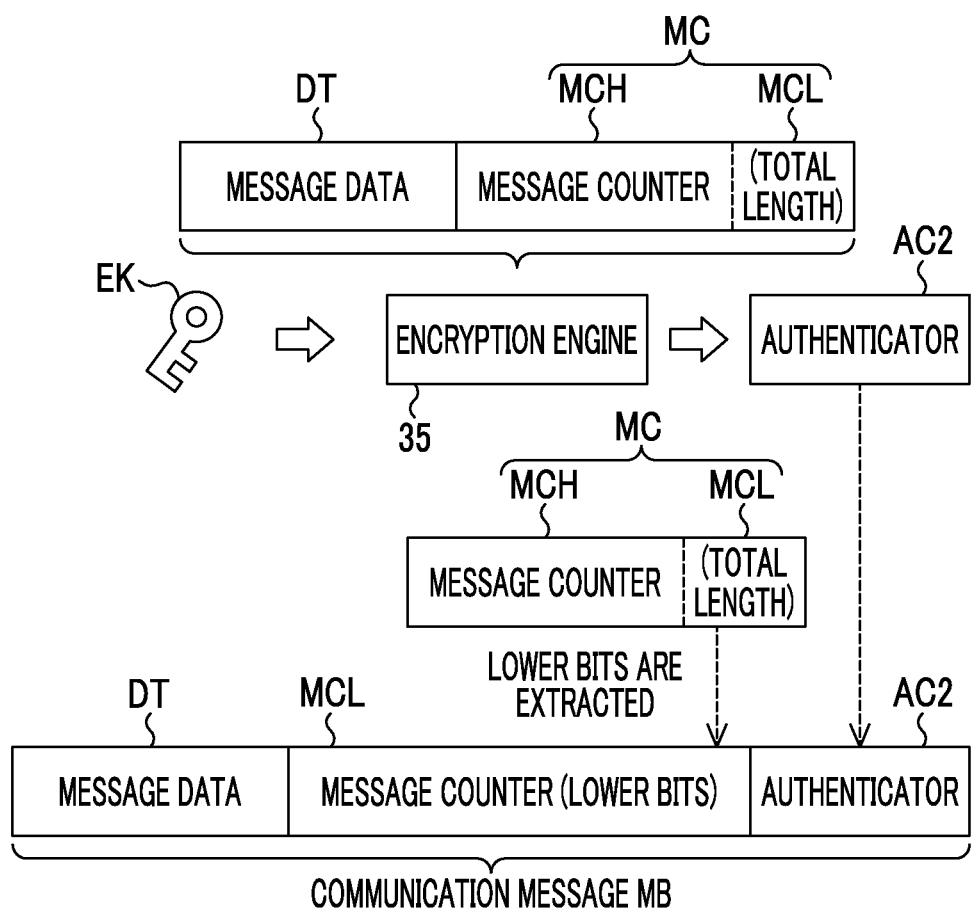
FIG. 4 is a schematic diagram illustrating an overview of a process that is executed by the electronic control unit (ECU) in transmission in the embodiment.

As illustrated in FIGS. 3 and 4, the first ECU 21 includes a communication I/F 30 for a CAN protocol, a plurality of MBOXs (MessageBox) 31a, 31b, 31c in which the communication message is temporarily stored, and an authenticator generator 33 that generates an "authenticator AC2" that is included in the communication message MB or the like to be transmitted. The "authenticator AC2" serves as a first authenticator. Further, the first ECU 21 includes a message processor 34 that processes the communication message MB to be transmitted and received with the authenticator, and an information processor 32 that processes a "message data DT". The function of each of the authenticator generator 33 and the message processor 34 are realized by a computing process of a program in the first ECU 21.

The communication I/F 30 receives the synchronization message MA via the communication bus L1 or transmits and receives the communication message MB. The MBOXs 31a, 31b, 31c relay the communication message MB received by the communication I/F 30. Further, the MBOXs 31a, 31b, 31c relay the communication message MB to be transmitted from the communication I/F 30. For example, the MBOX 31a relays communication message MB that does not include an authenticator between the communication I/F 30 and the information processor 32. Further, the MBOX 31b relays the communication message MB between the communication I/F 30 and the authenticator generator 33. The MBOX 31b particularly relays the synchronization message MA needed to manage the message counter MC. The MBOX 31c relays the communication message between the communication I/F 30 and the message processor 34. The MBOX 31c, for example, particularly relays the communication message MB.

The information processor 32 executes various applications that use the "message data DT" that is included in the communication message received by the first ECU 21. Further, the information processor 32 outputs the data output by various applications as the "message data DT" that is externally transmitted.

The message processor 34 ensures reliability of the communication message MB that is transmitted and received, as follows. When the communication message MB is received, the message processor 34 receives the communication message MB from the MBOX 31c, and authenticates the received communication message MB. The message processor 34 outputs the "message data DT" included in the authenticated communication message MB to the information processor 32.

Further, when the communication message MB is transmitted, the message processor 34 receives the "message data DT" from the information processor 32, and generates the "authenticator AC2" based on the received message data DT". The message processor 34 generates a communication message MB to be transmitted with the "message data DT" and the "authenticator AC2", and outputs the generated communication message MB to be transmitted to the MBOX 31c.

The authenticator generator 33 manages the "upper bits MCH" and the "lower bits MCL" of the message counter MC. The authenticator generator 33 may store the "upper bits MCH" and the "lower bits MCL" of the message counter MC at corresponding positions of one ensured storage area of the message counter MC or may store the "upper bits MCH" and the "lower bits MCL" in separately ensured storage areas. Further, in the authenticator generator 33, a value of the storage area for storing and holding the "lower bits MCL" or a value of the storage area for storing and holding the "upper bits MCH" is initialized by power-off or reset. The initialization often occurs asynchronously with another ECU or the gateway 10.

The authenticator generator 33 performs a process of synchronizing the message counter MC, a process in transmission of the communication message MB, and a process in reception of the communication message MB. Therefore, each process will be described in detail below.

Process of Synchronizing Message Counter

When the synchronization message MA is input from the MBOX 31b, the authenticator generator 33 authenticates the synchronization message MA and updates the value of the "upper bits MCH" with the value of the "upper bits MCH" included in the synchronization message MA on condition that the synchronization message MA is able to be authenticated. Further, the authenticator generator 33 initializes the value of the "lower bits MCL" into "0" on condition of the updating of the value of the "upper bits MCH". Thus, the "lower bits MCL" are set so that the "lower bits MCL" can be updated in a range from "0" to a maximum value.

Further, the authenticator generator 33 performs authentication of the synchronization message MA. The authenticator generator 33 acquires the "authenticator AC1" and the "upper bits MCH" from the synchronization message MA input from the MBOX 31b. The authenticator generator 33 encrypts the acquired "upper bits MCH" with an encryption engine 35 to regenerate an authenticator. The authenticator generator 33 compares the acquired regenerated authenticator with the "authenticator AC1" acquired from the synchronization message MA. When the regenerated authenticator and the "authenticator AC1" match as a result of the comparison, the authenticator generator 33 determines that the synchronization message MA is authenticated, and when the regenerated authenticator and the "authenticator AC1" do not match, the authenticator generator 33 determines that the synchronization message MA is not authenticated.

The authenticator generator 33 includes the encryption engine 35. The encryption engine 35 has a set encryption key EK, receives the message data DT or the message counter MC from the authenticator generator 33, and encrypts the message data DT or the message counter MC with the encryption key EK to generate the authenticator. Since the encryption key EK is set to be the same as an encryption key for the gateway 10, encrypted communication can be performed between the first ECU 21 and the gateway 10 and between the first ECU 21 and the second to fourth ECUs 22 to 24. It is desirable that the encryption key EK cannot be externally acquired using a tamper resistant memory or the like.

Process in Transmission of Communication Message

The authenticator generator 33 performs a process of generating the authenticator of the communication message MB to be transmitted as a process in transmission of the communication message MB. The authenticator generator 33 receives the "message data DT" from the message processor 34. The authenticator generator 33 reconstructs the message counter MC from the "lower bits MCL" that is managed and the "upper bits MCH" that is acquired from the synchronization message MA and held, and encrypts the reconstructed message counter MC and the input message data DT with the encryption key EK to generate the "authenticator AC2" using the encryption engine 35. Further, the authenticator generator 33 outputs the input "message data DT", the "lower bits MCL" used to generate the "authenticator AC2", and the generated "authenticator AC2" to the message processor 34. The message processor 34 generates the communication message MB to be transmitted, from the "message data DT", the "lower bits MCL", and the "authenticator AC2" input from the authenticator generator 33, and outputs the generated communication message MB to the MBOX 31c. Further, the authenticator generator 33 updates the "lower bits MCL" with a greater value according to the generation of the "authenticator AC2". Thus, when the "authenticator AC2" is generated, the message counter MC does not have the same value as a previous value again.

Process in Reception of Communication Message

The authenticator generator 33 performs an authentication process of the received communication message MB as a process in reception of the communication message MB. In the authentication process, the authenticator generator 33 performs authentication based on the "authenticator AC2".

The "message data DT" of the communication message MB received from the message processor 34, the "lower bits MCL" of the message counter MC, and the "authenticator AC2" are input to the authenticator generator 33. The authenticator generator 33 reconstructs the message counter MC from the input "lower bits MCL" and the managed "upper bits MCH", and encrypts the reconstructed message counter MC and the input "message data DT" using an encryption key EK with the encryption engine 35 to regenerate the "authenticator AC3". Further, the authenticator generator 33 compares the input "authenticator AC2" with the regenerated "authenticator AC3", determines that the communication message MB is authenticated when the authenticator AC2 and the authenticator AC3 match, and determines that the communication message MB is not authenticated when the authenticator AC2 and the authenticator AC3 do not match. The authenticator generator 33 outputs a result of the determination of the authentication to the message processor 34. The message processor 34 outputs the "message data DT" of the authenticated communication message MB to the information processor 32 and discards the "message data DT" of the non-authenticated communication message MB.

An operation of the communication system of the embodiment will be described. For convenience of description, it is assumed that the communication message MB is transmitted from the first ECU 21 and received by the third ECU 23.

Update of Upper Bit

FIGS. 6 and 7 illustrate a procedure of updating the "upper bits MCH" of the message counter MC. Execution of the procedure is started in each cycle or each time a predetermined condition is established in the gateway 10 or the ECUs 21 to 24.

As illustrated in FIG. 6, the gateway 10 determines whether a timing at which the synchronization message MA is transmitted is reached (step S10 in FIG. 6). The transmission timing is, for example, a time when the "upper bits MCH" of the message counter MC has been updated. In a case where the gateway 10 determines that the transmission timing is not reached (NO in step S10 of FIG. 6), the process of updating the upper bit temporarily ends.

On the other hand, in a case where the gateway 10 determines that the transmission timing is reached (YES in step S10 of FIG. 6), the gateway 10 transmits the "synchronization message MA" to all the ECUs 21 to 24 (step S11 in FIG. 6). The process of updating the upper bit temporarily ends.

As illustrated in FIG. 7, each of the ECUs 21 to 24 determines whether the ECU has received the synchronization message MA (step S20 in FIG. 7). When the ECU determines that the ECU has not received the synchronization message MA (NO in step S20 of FIG. 7), the process of updating the upper bit temporarily ends. On the other hand, in a case where the ECU determines that the ECU has received the synchronization message MA (YES in step S20 of FIG. 7), each of the ECUs 21 to 24 authenticates the "authenticator AC1" of the received synchronization message MA (step S21 in FIG. 7). The authentication of the "authenticator AC1" is performed through a comparison with the authenticator regenerated in the authenticator generator 33. When the authenticator AC1 and the regenerated authenticator match as a result of the comparison, the authenticator AC1 is authenticated, whereas when the authenticator AC1 and the regenerated authenticator do not match as a result of the comparison, the authenticator AC1 is not authenticated. In a case where the "authenticator AC1" of the synchronization message MA cannot be authenticated (NO in step S21 of FIG. 7), the process of updating the upper bit temporarily ends.

On the other hand, in a case where each of the ECUs 21 to 24 authenticates the authenticator AC1 of the synchronization message MA (YES in step S21 of FIG. 7), each of the ECUs 21 to 24 updates the "upper bits MCH" of the message counter MC stored in the ECU (step S22 in FIG. 7). The process of updating the upper bit temporarily ends.

Transmission and Reception of Communication Message

As illustrated in FIG. 4, when the information processor 32 generates the "message data DT", the first ECU 21 generates the "authenticator AC2" based on the "message data DT" and the message counter MC using the authenticator generator 33. The first ECU 21 generates the communication message MB from the "message data DT" and the "lower bits MCL" of the message counter MC when the authenticator AC2 is generated, and the generated "authenticator AC2", and transmits the generated communication message MB to the communication bus L1. The communication message MB transmitted to the communication bus L1 can be transferred from the communication bus L1 to the communication bus L2 by the gateway 10 and received by the third ECU 23 connected to the communication bus L2.

Figure 5:
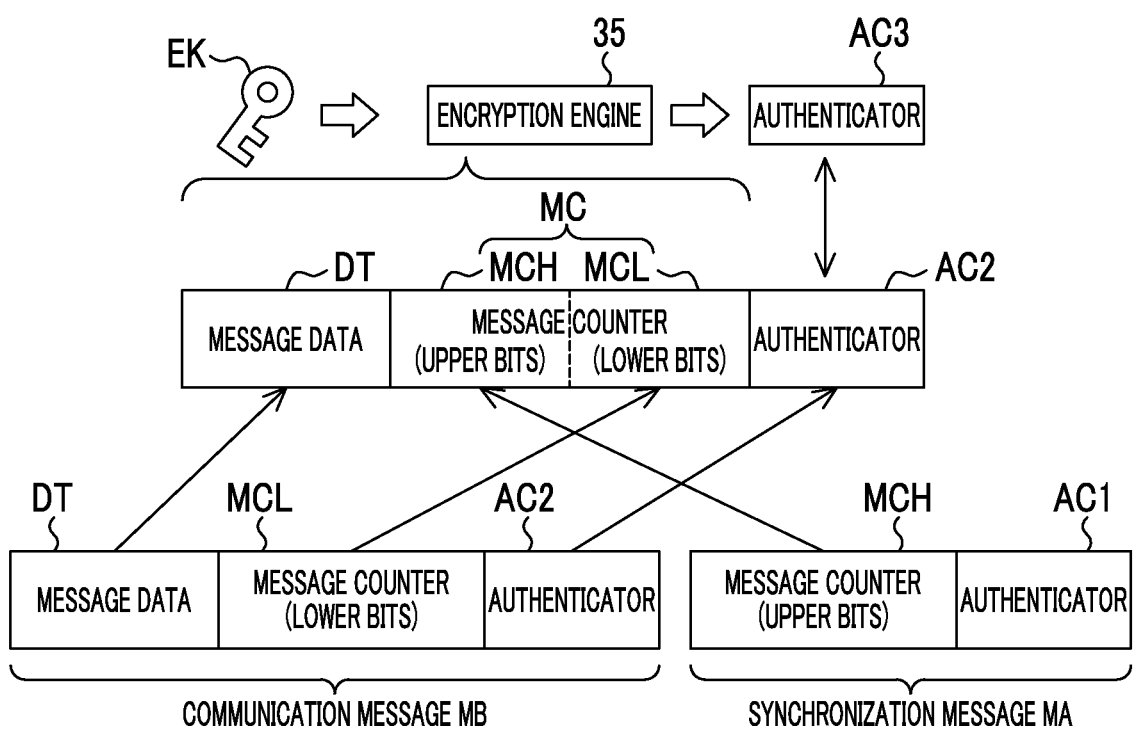
FIG. 5 is a schematic diagram illustrating an overview of a process that is executed by the electronic control unit (ECU) in reception in the embodiment.

As illustrated in FIG. 5, the third ECU 23 acquires the "message data DT", the "lower bits MCL" of the message counter MC, and the "authenticator AC2" from the communication message MB using the authenticator generator 33. Further, the third ECU 23 reconstructs the message counter MC from the "lower bits MCL" of the message counter MC and the "upper bits MCH" of the message counter MC acquired in advance from the synchronization message MA using the authenticator generator 33. The third ECU 23 regenerates the "authenticator AC3" from the "message data DT" and the reconstructed message counter MC using the encryption engine 35. Subsequently, the third ECU 23 compares the acquired "authenticator AC2" with the regenerated "authenticator AC3" to perform authentication in the authenticator generator 33. In a case where the received communication message MB is authenticated, the third ECU 23 sends the "message data DT" to the information processor 32. On the other hand, in a case where the received communication message MB is not authenticated, the communication message MB is discarded. Therefore, in a case where the communication message MB is a fraudulent message transmitted due to spoofing or the like, "message data DT" included in the fraudulent communication message MB is prevented from being sent to and processed by the information processor 32.

As described above, the following effects can be obtained according to the communication system of the embodiment.

(1) Only the "lower bits MCL" of the message counter MC is included in the communication message MB. Thus, it is possible to ensure a wide area for message data. Further, since the "upper bits MCH" are managed by the gateway 10, the "upper bits MCH" are synchronized among the respective ECUs 21 to 24. That is, each of the ECUs 21 to 24 on the reception side can reconstruct the message counter MC used for generation of the "authenticator AC2" in each of the ECUs 21 to 24 on the transmission side by combining the "upper bits MCH" from the gateway 10 with the "lower bits MCL" included in the communication message MB. Therefore, even when a size of the message counter MC is set to a size needed to ensure the reliability, it is possible to suppress a capacity needed for storage of the communication message MB to be a small capacity, and to prevent a reduction in capacity for the message data. Thus, it is possible to ensure the reliability of the communication message MB while suppressing an increase in traffic.

(2) The "upper bits MCH" of the message counter MC transmitted from the gateway 10 is received, the "upper bits MCH" of the message counter MC stored in each of the ECUs 21 to 24 is updated with the "upper bits MCH" of the received message counter MC, that is, is synchronized. Therefore, even when the message counter MC is divided into two, the "upper bits MCH" and the "lower bits MCL", it is possible to authenticate the communication message MB using the message counter MC.

Further, it is possible to synchronize the "upper bits MCH" of the message counter MC stored in each of the ECUs 21 to 24. Therefore, even when the "upper bits MCH" of the message counter MC stored in the ECUs 21 to 24 is asynchronously initialized by a reset of the ECUs 21 to 24 or the like, the stored message counter MC is reset to a normal value, and it is possible to perform the authentication normally.

(3) Since the message counter MC is managed separately from the "message ID", the size of the message counter MC is suppressed. Further, when the "Message ID" is separate, a time margin is obtained even in the updating of the "lower bits MCL" of the message counter MC, and therefore, a degree of freedom of the synchronization of the message counter MC increases.

(4) The reliability of communication content can be maintained for the "upper bits MCH" of the message counter MC transmitted in the synchronization message MA from the gateway 10 by using the "authenticator AC1" obtained by encrypting the "upper bits MCH" of the message counter MC transmitted in the synchronization message MA using the encryption key EK.

That is, the "authenticator AC1" transmitted in the synchronization message MA from the gateway 10 is the "authenticator AC1" generated from the "upper bits MCH" of the message counter MC. Therefore, in each of the ECUs 21 to 24 that have received the synchronization message MA, the "authenticator AC1" transmitted in the synchronization message MA, and the authenticator regenerated from the "upper bits MCH" of the message counter MC transmitted in the synchronization message MA can be acquired, and the authentication of the synchronization message MA can be performed through a comparison of the authenticators. Therefore, each of the ECUs 21 to 24 can receive the synchronization message MA from the gateway 10 to acquire the "upper bits MCH" of the message counter MC of which reliability has been ensured, and perform authentication of the synchronization message MA based on the upper bits MCH.

(5) Since the value of the message counter MC is updated not to duplicate, the retransmitted communication message MB can be determined not to be valid even when the transmitted communication message MB is retransmitted.

(6) The reliability of the authenticators AC1, AC2, that is, the reliability of the communication message MB is ensured by a common encryption key EK. It is desirable that the encryption key EK cannot be externally acquired using a tamper resistant memory or the like.

Other Embodiments

The above embodiments can also be embodied in the following aspects.

Synchronization Message

In the above embodiment, the case where the message counter MC is transmitted in the synchronization message MA has been exemplified. In this case, for one message ID, one message ID used for the synchronization message may be provided. In this case, the number of message IDs is likely to be double or more in an entire communication system.

Further, for all message IDs, only one message ID used for the synchronization message may be provided. In this case, the number of message IDs is only increased by one in the entire communication system. Further, for a plurality of message IDs fewer than all message IDs, message IDs used for the synchronization message may be provided one by one. That is, when the synchronization message can be shared, it is possible to suppress the number of message IDs to be assigned to the synchronization message to be small from among the limited number of message IDs. When the number of message IDs is suppressed to be small, suppression of an increase in the area for storing the message ID or the message data, suppression of an increase in a processing load, suppression of an increase in a communication load, and the like are achieved.

Gateway

In the above embodiment, the case where the gateway 10 relays the communication message MB between the communication buses L1, L2 has been exemplified. However, the present disclosure is not limited thereto and the gateway may be connected to one communication bus or the communication message may be relayed among more than two communication buses.

In the above embodiment, the case where the gateway 10 manages and transmits the synchronization message MA has been exemplified. However, the present disclosure is not limited thereto, and the ECU may manage and transmit the synchronization message.

In the above embodiment, the case where one gateway 10 manages and transmits the synchronization message MA has been exemplified. However, the present disclosure is not limited thereto, and a plurality of gateways or ECUs may manage the synchronization message in a shared manner.

In the above embodiment, the case where the code manager 11 stores and manages the "upper bits MCH" of the message counter MC has been exemplified. However, the present disclosure is not limited thereto, and the code manager may hold a total length of the message counter MC. The code manager may manage a bit portion corresponding to the "upper bits MCH" of the message counter MC. The latest value of the "lower bits MCL" of the message counter MC may be acquired from the communication message MB.

In the above embodiment, the case where the transmitter 12 transmits a part of the message counter MC has been exemplified. However, the present disclosure is not limited thereto, and the transmitter may transmit the entity (total number of bits) of the message counter using the synchronization message as long as the gateway holds the entity of the message counter. The ECU that has received the synchronization message may use only a portion corresponding to the upper bits in the entity (total number of bits) of the message counter.

Communication Protocol

In the above embodiment, the case where the communication protocol is the CAN protocol has been exemplified. However, the present disclosure is not limited thereto, and the communication protocol may be a protocol other than the CAN protocol, such as a communication protocol such as Ethernet (registered trademark) or FlexRay (registered trademark) as long as the message counter is used to ensure reliability of the communication message.

Message Counter

In the above embodiment, the case where the length of the message counter MC is 8 bytes (64 bits) has been exemplified. However, the present disclosure is not limited thereto, and the length of the message counter may be, for example, 124 bits longer than 64 bits or, on the contrary, 32 bits shorter than 64 bits as long as the same value is not repeated again or a long time interval can be ensured even when the same value is repeated.

In the above embodiment, the case where the code manager 11 updates the "upper bits MCH" according to the "lower bits MCL" having the maximum value, that is, an aspect that is the same as a carry occurring in a bit string has been exemplified. However, the present disclosure is not limited thereto, and the code manager may also update the "upper bits MCH" according to a predetermined condition for transmitting the synchronization message MA being established. The predetermined condition can be one or a plurality of conditions such as a case where ignition is changed from "off" to "on" or a case where a predetermined time (for example, Y msec: Y is a settable value) has elapsed from a point in time at which a previous synchronization message has been updated (transmitted), and a condition that is a combination of the above conditions.

In the above embodiment, the case where the value of the "upper bits MCH" is increased by "1" (monotonically increased) in the gateway 10 according to the "lower bits MCL" of the message counter MC being changed from "0" to the maximum value has been exemplified. However, the present disclosure is not limited thereto, and the "upper bits MCH" may be updated using a timing before "the lower bits MCL" exceeds the maximum value as an update timing as long as the message counter MC does not have the same value again. In this case, when a time when the "lower bits MCL" has a value as close as possible to the maximum value is used as the update timing, the number of bits of the message counter MC can be effectively used. For example, the code manager may receive the communication message that is transmitted by the ECU to monitor the "lower bits MCL" of the message counter, and use a time when the "lower bits MCL" are equal to or greater than an update value that is a threshold value set below the maximum value, as the update timing.

In the above embodiment, the case where the "lower bits MCL" of the message counter MC is changed from the initial value "0" to the maximum value has been exemplified. However, the present disclosure is not limited thereto, and the initial value may be set to a value greater than "0" and may return to "0" subsequent to the maximum value and be changed to a value before the initial value.

In the above embodiment, the case where the value of the message counter MC is incremented by "1" each time the communication message MB is transmitted has been exemplified. However, the present disclosure is not limited thereto, and as long as the reliability of the communication message is ensured, the message counter may decrease, for example, from the maximum value to "0" so that the same value is not used again or may be irregularly changed. Since the upper bit and the lower bit are separately managed, a change aspect of the upper bits and a change aspect of the lower bits may be the same or may be separate.

In the above embodiment, the case where one message counter MC corresponds to one message ID has been exemplified. However, the present disclosure is not limited thereto, and a plurality of message IDs may correspond to one message counter. In a case where the message counter may correspond to a plurality of message IDs, the number of message counters to be managed can be reduced.

In the above embodiment, the case where the message counter MC does not have the same value again has been exemplified, but the present disclosure is not limited thereto, and the message counter MC may temporarily have the same value. For example, in a case where the updating of the "upper bit" is not made in time or synchronization cannot be performed, the message counter may temporarily have the same value as the past value and used twice. Further, the same value may be used a predetermined number of times as long as the needed reliability can be ensured.

In the above embodiment, the case where the "upper bits MCH" are 7 bytes and the "lower bits MCL" are 1 byte has been exemplified. However, the present disclosure is not limited thereto, and the upper bits and the lower bits may be separated by other bytes, such as "6 bytes" and "2 bytes". Further, the upper bits and the lower bits may be separated in units of bits such as "60 bits" and "4 bits" instead of being separated in bytes.

Message Box

In the above embodiment, the case where MBOXs 31a, 31b, 31c are included has been exemplified, but the present disclosure is not limited thereto. The MBOX can relay and temporarily store a transmitted or received communication message so that the communication message can be exchanged with an appropriate unit in the ECU, and the number of MBOXs may be one, two, or four.

Authenticator Generator

In the above embodiment, the case where the authentication based on the "authenticator AC2" is performed is exemplified. In this case, the "lower bits MCL" of the message counter MC may be acquired from the communication message MB prior to the authentication based on the "authenticator AC2", and it may be confirmed whether or not the acquired "lower bits MCL" are greater (updated) than the previous acquired "lower bits MCL". In a case where the acquired "lower bits MCL" are greater (updated), the authentication based on the "authenticator AC2" may be performed. On the other hand, in a case where the acquired "lower bits MCL" are not greater (not updated), it may be determined that the authentication is not performed, and the authentication based on the "authenticator AC2" may be omitted.

What is claimed is:

1. A communication system, comprising:
   a gateway configured to store first information in a management code formed by combining the first information and second information, the gateway being configured to manage the stored first information to update the stored first information once, each time the second information is updated predetermined times;
   a first electronic control unit (ECU) communicatably connected to the gateway over a communication network; and
   a second ECU communicatably connected to the gateway over the communication network, wherein:
   the gateway is configured to transmit a first communication message including the first information to the communication network;
   the first ECU and the second ECU are configured to receive the first communication message and to hold the first information included in the received first communication message each time the first ECU and the second ECU receive the first communication message;
   the second ECU is configured to manage the second information in the management code, and configured to generate an entire first authenticator from communication data and the management code formed by combining the held first information with the managed second information, generate and transmit a second communication message including the communication data, the managed second information, and the generated entire first authenticator and not including the held first information, and update a value of the managed second information after the generation of the second communication message;
   the first ECU is configured to receive the second communication message transmitted by the second ECU, and authenticate the received second communication message based on a comparison between the entire first authenticator included in the received second communication message and a regenerated entire authenticator regenerated based on the received second communication message;
   the first ECU is configured to reconstruct the management code by combining the held first information with the second information acquired from the second communication message, and acquire the regenerated authenticator from the communication data acquired from the second communication message transmitted by the second ECU and the reconstructed management code; and
   the management code is bit data, the first information being upper bits of the bit data and the second information being lower bits of the bit data, wherein a change aspect of the upper bits and a change aspect of the lower bits are configured to be separate, and a value of the upper bits of the bit data is configured to be irregularly changed.

2. The communication system according to claim 1, wherein:
the gateway is configured to set the first communication message including the first information as a communication message including an entire second authenticator generated from the first information, and the first information; and
each of the first ECU and the second ECU is configured to receive the first communication message transmitted by the gateway, and perform authentication of the received first communication message through a comparison between the entire e second authenticator included in the received first communication message and a regenerated entire authenticator regenerated from the first information included in the received first communication message.

3. The communication system according to claim 1, wherein:
the gateway is configured to update the upper bits with a new value not duplicating a previous value at a timing before all patterns of the lower bits are used up, and transmit the first communication message; and
the second ECU is configured to initialize the lower bits of the management code each time the first communication message transmitted from the gateway is received, and perform updating of the lower bits of the management code that is performed each time the first communication message is generated, with a non-duplicating value before the first communication message transmitted from the gateway is subsequently received.

4. The communication system according to claim 1, wherein:
different identifiers are added to the first communication message and the second communication message according to communication content; and
the gateway is configured to manage the management code separately from the identifiers.

5. The communication system according to claim 1, wherein the second ECU and the first ECU have a common encryption key and are configured to generate the entire first authenticator using the encryption key.

6. The communication system according to claim 2, wherein the second ECU and the first ECU have a common encryption key and are configured to generate the entire first authenticator using the encryption key.

7. The communication system according to claim 6, wherein the gateway has an encryption key that is common to the second ECU and the first ECU, and is configured to generate the entire second authenticator using the encryption key.

8. The communication system according to claim 1, wherein the gateway is configured to transmit the first communication message when the first information is updated.

9. The communication system according to claim 3, wherein:
the second information is a counter that increments sequentially from an initial value 0 to a maximum value; and
the gateway is configure to update the first information according to the second information being the maximum value.

10. The communication system according to claim 3, wherein:
the second information is a counter that increments sequentially from an initial value 0 to a maximum value; and
the gateway is configured to update the first information when the second information is equal to or greater than an update value that is a threshold set below the maximum value.

11. A communication method that is used in a communication system including a gateway configured to store first information in a management code formed by combining the first information and second information in the gateway, the gateway being configured to manage the stored first information to update the stored first information once, each time the second information is updated predetermined times, and a first ECU and a second ECU communicatably connected to the gateway over a communication network, the communication method comprising:
transmitting, by the gateway, a first communication message including the first information;
receiving the first communication message, by the first ECU and the second ECU, and holding, by the first ECU and the second ECU, the first information included in the received first communication message each time the first communication message transmitted by the gateway is received;
managing, by the second ECU, the second information in the management code, generating an entire first authenticator from communication data and the management code formed by combining the held first information with the managed second information, generating and transmitting a second communication message including the communication data, the managed second information, and the generated entire first authenticator and not including the held first information, and updating a value of the managed second information after the generation of the second communication message;
receiving, by the first ECU, the second communication message transmitted by the second ECU, and authenticating the received second communication message based on a comparison between the entire first authenticator included in the received second communication message and a regenerated entire authenticator regenerated based on the received second communication message; and
reconstructing, by the first ECU, the management code by combining the held first information with the second information acquired from the first communication message transmitted by the second ECU, and acquiring the regenerated entire authenticator from the communication data acquired from the second communication message transmitted by the second ECU and the reconstructed management code,
wherein:
the management code is bit data, the first information being upper bits of the bit data and the second information being lower bits of the bit data;
a change aspect of the upper bits and a change aspect of the lower bits are configured to be separate; and
a value of the upper bits of the bit data is configured to be irregularly changed.

* * * * *